(12) United States Patent
Murai et al.

(10) Patent No.: US 10,093,808 B2
(45) Date of Patent: Oct. 9, 2018

(54) CIRCUMFERENTIAL COATING MATERIAL AND CIRCUMFERENTIALLY COATED HONEYCOMB STRUCTURE

(71) Applicant: NGK INSULATORS, LTD., Nagoya (JP)

(72) Inventors: Makoto Murai, Nagoya (JP); Yoshihiro Sato, Nagoya (JP); Kazunari Akita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 19 days.

(21) Appl. No.: 15/269,083

(22) Filed: Sep. 19, 2016

(65) Prior Publication Data

US 2017/0002205 A1  Jan. 5, 2017

Related U.S. Application Data

(63) Continuation of application No. PCT/JP2016/058402, filed on Mar. 16, 2016.

(30) Foreign Application Priority Data

Mar. 25, 2015 (JP) .................. 2015-063080

(51) Int. Cl.
  *C09D 1/00* (2006.01)
  *C04B 38/00* (2006.01)
  (Continued)

(52) U.S. Cl.
  CPC .............. *C09D 1/00* (2013.01); *B01D 39/20* (2013.01); *B01D 46/00* (2013.01);
  (Continued)

(58) Field of Classification Search
  None
  See application file for complete search history.

(56) References Cited

U.S. PATENT DOCUMENTS

| 8,147,952 B2 | 4/2012 | Iwamoto et al. |
| 2005/0123716 A1* | 6/2005 | Miwa .................. F01N 3/28 428/116 |

(Continued)

FOREIGN PATENT DOCUMENTS

| JP | 2011-084448 A1 | 4/2011 |
| JP | 2011-206724 A1 | 10/2011 |

(Continued)

OTHER PUBLICATIONS

International Search Report and Written Opinion (Application No. PCT/JP2016/058402) dated May 31, 2016.

*Primary Examiner* — Daniel J. Schleis
(74) *Attorney, Agent, or Firm* — Burr & Brown, PLLC

(57) ABSTRACT

A circumferential coating material contains colloidal silica, silicon carbide, and titanium oxide different in particle diameters from silicon carbide, coats a circumferential surface of a honeycomb structure monolithically formed by extrusion, including as a main component, cordierite having a porosity of 50 to 75%, and forms a circumferential coating layer. A circumferentially coated honeycomb structure has a honeycomb structure comprising latticed porous partition walls defining and forming a plurality of polygonal cells forming through channels and extending from one end face to the other end face, and a circumferential coating layer formed by coating at least a part of a circumferential surface of the honeycomb structure with the circumferential coating material.

5 Claims, 1 Drawing Sheet

(51) Int. Cl.
  *B01D 46/24*   (2006.01)
  *B01D 39/20*   (2006.01)
  *B01D 46/00*   (2006.01)
  *B01J 33/00*   (2006.01)
  *B01J 35/04*   (2006.01)
  *C04B 41/85*   (2006.01)
  *C04B 41/00*   (2006.01)
  *C04B 41/50*   (2006.01)
  *F01N 3/021*   (2006.01)
  *F01N 3/022*   (2006.01)
  *B01J 37/02*   (2006.01)
  *C04B 111/00*  (2006.01)

(52) U.S. Cl.
  CPC .......... *B01D 46/2444* (2013.01); *B01J 33/00* (2013.01); *B01J 35/04* (2013.01); *B01J 37/0232* (2013.01); *C04B 38/00* (2013.01); *C04B 41/009* (2013.01); *C04B 41/5089* (2013.01); *C04B 41/85* (2013.01); *F01N 3/021* (2013.01); *F01N 3/0222* (2013.01); *B01D 2046/2433* (2013.01); *B01D 2046/2437* (2013.01); *C04B 2111/0081* (2013.01); *C04B 2111/00793* (2013.01); *F01N 2260/24* (2013.01); *F01N 2510/00* (2013.01); *Y02T 10/20* (2013.01)

(56) References Cited

U.S. PATENT DOCUMENTS

| | | | |
|---|---|---|---|
| 2007/0243357 A1* | 10/2007 | Ichikawa | C04B 35/195 428/116 |
| 2008/0280064 A1 | 11/2008 | Tokunaga et al. | |
| 2010/0112280 A1 | 5/2010 | Iwamoto et al. | |
| 2011/0224071 A1 | 9/2011 | Okumura et al. | |
| 2015/0007553 A1* | 1/2015 | Omiya | F01N 3/2828 60/277 |

FOREIGN PATENT DOCUMENTS

| | | |
|---|---|---|
| JP | 2011-206764 A1 | 10/2011 |
| WO | 2007/072694 A1 | 6/2007 |
| WO | 2009/014200 A1 | 1/2009 |

* cited by examiner

CIRCUMFERENTIAL COATING MATERIAL AND CIRCUMFERENTIALLY COATED HONEYCOMB STRUCTURE

BACKGROUND OF THE INVENTION

1. Field of the Invention

The present invention relates to a circumferential coating material and a circumferentially coated honeycomb structure, and more particularly, it relates to a circumferential coating material which coats a circumferential surface of a honeycomb structure to make a circumferential coating layer (a circumferential wall), and a circumferentially coated honeycomb structure including the circumferential coating layer.

2. Description of Related Art

Heretofore, honeycomb structures made of ceramics have been applied in broad use applications such as a car exhaust gas purifying catalyst carrier, a diesel particulate removing filter, and a heat reservoir for a combustion device. The honeycomb structure made of the ceramics (hereinafter referred to simply as "the honeycomb structure") is manufactured through a firing step of firing, at a high temperature, a honeycomb formed body of a forming material (a kneaded material) monolithically extruded into a desirable honeycomb shape by use of an extruder. The particulate removing filter is constituted by closing through channels of the honeycomb formed body alternately on an inlet side and an outlet side so that a gas flowing inside is emitted to the outlet side through partition walls of the honeycomb formed body.

The honeycomb structure includes latticed partition walls defining and forming a plurality of polygonal cells forming the through channels for a fluid and extending from one end face to the other end face. These partition walls are made of a porous material. In a case where the honeycomb structure is used as the car exhaust gas purifying catalyst carrier, a catalyst solution including a noble metal-based catalyst of platinum or the like is introduced into the honeycomb structure. After the elapse of a predetermined time, the catalyst solution is discharged from the honeycomb structure and is subjected to drying and baking treatments, thereby loading the catalyst onto the surfaces and inner portions of the partition walls which are defined by the porous partition walls.

In recent years, in the case of a direct injection type engine in gasoline engines, it has been regarded as a problem that soot particulates similar to those in diesel engines are discharged, and attachment of a particulate removing filter has proceeded in the same manner as in the diesel engine. In the case of the gasoline engine, an exhaust gas temperature is usually higher than that in the diesel engine, and hence the noble metal based catalyst more effectively functions, and therefore, in the gasoline direct injection (GDI) engine, a gasoline particulate filter (GPF) which is made of cordierite and onto which the noble metal-based catalyst is loaded is mainly for use. Improvements in engine output and fuel efficiency require decrease of pressure loss of the filter. To eliminate such a problem, there is manufactured a high-porosity filter in which a porosity of porous partition walls heightens as compared with a conventional honeycomb structure. Furthermore, the high-porosity filter has a porosity of, for example, 50% or more.

Additionally, in recent years, the honeycomb structures have included various characteristics in accordance with their use purposes or use methods, and it has remarkably been difficult to judge the characteristics of the respective honeycomb structures, and the like from their appearances. Therefore, at the time of manufacturing completion, information necessary for product control (the product control information) can directly be printed on a circumferential surface of the honeycomb structure. Here, examples of the product control information include various pieces of information such as a product name, a product number (a model number), a manufacturing number (a lot number), a manufacturing place (a manufacturing factory), and a manufacturing line number. On the basis of these pieces of product control information, it is possible to control and grasp, for example, a manufacturing process from the manufacturing of the honeycomb structure for mounting thereof in a car.

In particular, to collectively display the above plurality of pieces of product control information once, a well-known bar code or a QR code (registered trademark) (a two-dimensional code) is printed on the circumferential surface (the surface) of the honeycomb structure. By reading the product control information printed on the circumferential surface with a scanner, it is possible to perform the product control in manufacturing steps of the honeycomb structure.

As a result, for example, it is possible to easily and immediately acquire a moving route of each of the honeycomb structures for a period of time from the time of the manufacturing completion of the honeycomb structure until the mounting as one part of the car or the like, the number of the honeycomb structures in stock and a storage period of time from when the honeycomb structures are brought in a warehouse until the honeycomb structures are actually used, a storage place, present states and the like. Consequently, it is possible to achieve traceability concerning the manufacturing of the honeycomb structures, and it is possible to immediately access the above information. Therefore, the printing of the product information and the like on the circumferential surface of the honeycomb structure is remarkably useful in terms of the product control.

Here, the printing of product information such as the two-dimensional code to the circumferential surface of the honeycomb structure is performed by applying a substrate material to the circumferential surface of the honeycomb structure by pad printing or the like and subjecting the material to laser marking, well-known printing such as ink jet printing, or a printing technology.

Furthermore, it has been suggested that the circumferential surface of the honeycomb structure is coated with a circumferential coating material containing laser color developing raw material powder at a predetermined blend ratio, and the laser marking is performed on the surface of a formed circumferential coating layer (a circumferential wall), which enables clear displaying information such as characters or diagrams to be displayed (see Patent Document 1).

CITATION LIST

Patent Documents

[Patent Document 1] JP-A-2011-206724

SUMMARY OF THE INVENTION

Problem to be Solved by the Invention

In a comparatively small honeycomb structure for use in a GPF, partition walls, and a circumferential wall are usually monolithically formed. Such a honeycomb structure is prepared by simultaneously forming the partition walls and the circumferential wall by extrusion and firing an obtained formed body, and the circumferential wall and the partition walls have the same porosity. Here, when the porosity of the honeycomb structure is high, there is the possibility that a problem mentioned below occurs. That is, the catalyst solution introduced into the honeycomb structure in a catalyst loading step would leak out from a circumferential surface of the honeycomb structure. Further, when the catalyst solution leaks outside in this manner, operation properties deteriorate in the step of loading a catalyst onto the partition walls of the honeycomb structure. Furthermore, the catalyst solution which leaks out to the circumferential surface cannot exert a catalytic function, and hence an expensive noble metal-based catalyst is not only wasted but also it is difficult to read information displayed on the circumferential surface because the catalyst solution has color.

On the above circumferential surface of the honeycomb structure, product information is printed by laser printing, pad printing or ink jet printing. For example, in a case where the printing of the product information or the like is performed by the laser printing, when the catalyst solution leaks out to the circumferential surface of the honeycomb structure, contrast between the circumferential surface and printed characters or the like is small, and it would be difficult to recognize the product information.

On the other hand, in the case of the pad printing, a substrate material is not sufficiently transferred from a high-porosity pad to the circumferential wall and becomes thin, and hence there occurs the problem that during laser marking, printing becomes thin and printed information cannot be read. Even when the printing is possible without any problems, there occurs the problem that the contrast deteriorates due to the leak-out of the catalyst solution to make it impossible to read the printed information or the like, and it would be difficult to recognize the printed information. Similarly, in the case of the ink jet printing, ink discharged from an ink head is not fixed to the circumferential surface, and it would be difficult to recognize the printed information.

To eliminate such problems, the present invention has been developed in view of the above situations, and there are provided a circumferential coating material which inhibits a catalyst solution loaded onto a high-porosity honeycomb structure including porous partition walls from leaking out from a circumferential surface of the honeycomb structure, and suitably obtains a printing performance of product information to be printed on the circumferential surface, and a circumferentially coated honeycomb structure.

Means for Solving the Problem

According to the present invention, there are provided a circumferential coating material and a circumferentially coated honeycomb structure as mentioned below.

According to a first aspect of the present invention, a circumferential coating material is provided which contains colloidal silica, silicon carbide, and titanium oxide different in average particle diameter from the silicon carbide, coats a circumferential surface of a honeycomb structure monolithically formed by extrusion, including as a main component, cordierite having a porosity of 50 to 75%, and forms a circumferential coating layer.

According to a second aspect of the present invention, the circumferential coating material according to the above first aspect is provided, which contains 15 to 50 mass % of the colloidal silica, contains 25 to 35 mass % of the silicon carbide, and contains 25 to 35 mass % of the titanium oxide.

According to a third aspect of the present invention, the circumferential coating material according to the above second aspect is provided, which contains 15 to 30 mass % of the colloidal silica, contains 30 to 35 mass % of the silicon carbide, contains 30 to 35 mass % of the titanium oxide, and contains 0 to 15 mass % of water.

According to a fourth aspect of the present invention, the circumferential coating material according to any one of the above first to third aspects is provided, wherein the average particle diameter of the silicon carbide is from 1.0 to 10 μm, and the average particle diameter of the titanium oxide which are different from those of the silicon carbide are from 0.1 to 1.0 μm.

According to a fifth aspect of the present invention, the circumferential coating material according to any one of the above first to fourth aspects is provided, wherein the circumferential coating layer formed on the circumferential surface of the honeycomb structure exerts laser color developing properties by laser printing and/or printing properties of ink jet printing.

According to a sixth aspect of the present invention, a circumferentially coated honeycomb structure using the circumferential coating material according to any one of the above first to fifth aspects is provided, which has a honeycomb structure including latticed porous partition walls defining and forming a plurality of polygonal cells forming through channels and extending from one end face to the other end face, and a circumferential coating layer formed by coating at least a part of a circumferential surface of the honeycomb structure with the circumferential coating material.

Effect of the Invention

According to a circumferential coating material of the present invention, a circumferentially coated honeycomb structure having a circumferential coating layer is formed by coating a circumferential surface of the high-porosity honeycomb structure with the circumferential coating material, so that it is possible to prevent a catalyst solution from leaking out from the circumferential surface, and it is possible to suitably obtain color developing or reading properties of laser marking and/or reading properties of ink jet printing onto the circumferential coating layer.

DETAILED DESCRIPTION OF THE INVENTION

Figure 1:
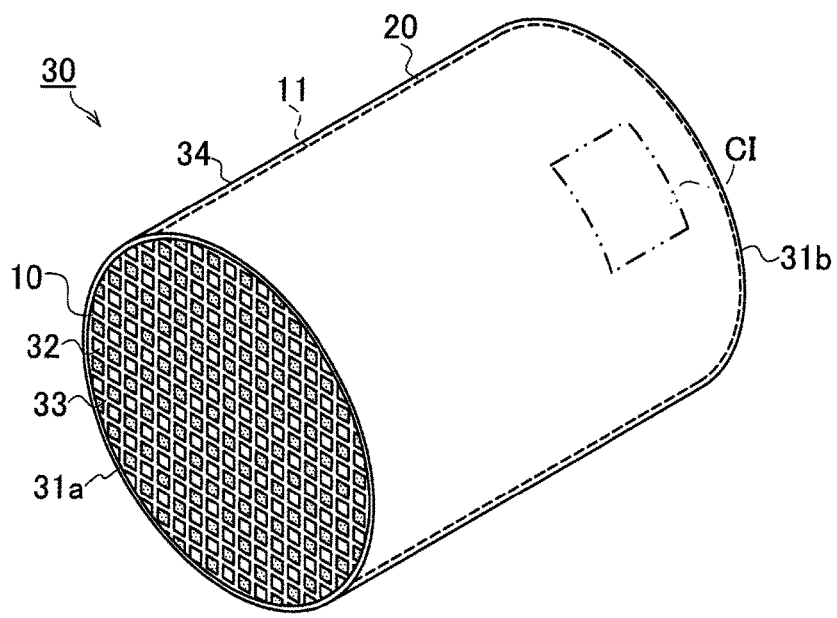
FIG. 1 is a perspective view schematically showing one example of a constitution of a circumferentially coated honeycomb structure of the present invention.

Hereinafter, embodiments of a circumferential coating material and a circumferentially coated honeycomb structure of the present invention will be described with reference to the drawings, respectively. The present invention is not limited to the following embodiments, and changes, modifications, improvements and the like can be added without departing from the gist of the present invention.

The circumferential coating material of one embodiment of the present invention mainly contains colloidal silica, silicon carbide, and titanium oxide, for use in a honeycomb structure 10 of a high porosity (from 50 to 70%) which is monolithically formed by extrusion. It is possible to form a circumferential coating layer 20 by uniformly coats a circumferential surface 11 of the honeycomb structure 10 with the above circumferential coating material.

On the other hand, a circumferentially coated honeycomb structure 30 of the one embodiment of the present invention has the honeycomb structure 10 monolithically formed by the extrusion, including cordierite as a main component, and the circumferential coating layer 20 formed by coating the circumferential surface 11 of the honeycomb structure 10 with the above circumferential coating material. The circumferentially coated honeycomb structure 30 includes latticed porous partition walls 33 defining and forming a plurality of polygonal cells 32 forming through channels and extending from one end face 31a to the other end face 31b.

The circumferential coating material of the present embodiment contains colloidal silica, silicon carbide, and titanium oxide. Here, colloidal silica functions as a bonding material, and each of silicon carbide and titanium oxide functions as a color developing agent. The circumferential coating material of the present embodiment contains 15 to 50 mass % of colloidal silica, 25 to 35 mass % of silicon carbide, and 25 to 35 mass % of titanium oxide.

The circumferential surface 11 of the honeycomb structure 10 is coated with the circumferential coating material prepared at the above blend ratios of the ranges by use of a well-known coating technology such as spray coating or roller coating. Consequently, the circumferential coating layer 20 is formed in a predetermined membrane thickness. A solid content concentration of the circumferential coating material prepared at the above blend ratios is in a range of about 70 to 76%.

Furthermore, at the above blend ratios, the circumferential coating material of the present embodiment may contain, for example, 15 to 30 mass % of colloidal silica, 30 to 35 mass % of silicon carbide, 30 to 35 mass % of titanium oxide, and 0 to 15 mass % of water. Consequently, it is possible to decrease an amount of colloidal silica for use in a total amount of the circumferential coating material, and it is possible to inhibit clogging due to adhesion of the coating material at a nozzle outlet during the spray coating, or the adhesion due to drying of the coating material in a roller coating step. At this time, to inhibit viscosity rise accompanying decrease of colloidal silica, 0 to 15 mass % of water is newly added. The solid content concentration of the circumferential coating material prepared at the above blend ratios is about 76%. In this case, water does not necessarily have to be added (=0 mass %).

Two types of color developing agents are added to the circumferential coating material of the present embodiment as described above. Here, for silicon carbide and titanium oxide for use, the agents having different average particle diameters, respectively, are used, and further specifically, titanium oxide having an average particle diameter smaller than silicon carbide is used. In the circumferential coating material of the present embodiment, to silicon carbide having an average particle diameter in a range of 1.0 to 10 μm, there is used titanium oxide having an average particle diameter in a range of 0.1 to 1.0 μm which is smaller than that of the silicon carbide.

By using the color developing agents having small average particle diameter, color development becomes uniform in a region irradiated with the laser, and a printed two-dimensional code indicate high reading properties. Silicon carbide having further large average particle diameter can inhibit color developing particles from excessively penetrating into outer walls, and can clearly develop the color of printing. As a result, any oozing, shift or the like does not occur in product control information such as a bar code printed by the laser irradiation, but a reading performance by a scanner can improve.

According to the circumferential coating material of the present embodiment, the circumferential coating layer 20 which covers the whole circumferential surface 11 is formed by coating the circumferential surface 11 of the honeycomb structure 10 of the high porosity of 50 to 70% with the circumferential coating material. The partition walls 33 constituting the honeycomb structure 10 are made of a porous material, and also in the circumferential surface 11, fine pores (not shown) which open outside are present. In particular, the honeycomb structure 10 has a high porosity of 50 to 70%, and hence the number of the fine pores and a pore area indicated in the circumferential surface 11 also increase. Consequently, there occurs such leak-out of a catalyst solution as already mentioned in the problem.

To eliminate such a problem, the circumferential surface 11 includes the circumferential coating layer 20, so that it is possible to close the fine pores opened in the circumferential surface 11 by the circumferential coating material. Consequently, even in a case where the catalyst solution loaded onto the surfaces and inner portions of the partition walls 33 of the circumferentially coated honeycomb structure 30 passes through the partition walls 33 and reaches the vicinity of the circumferential surface 11 of the honeycomb structure 10, the fine pores are closed by the circumferential coating layer 20, and hence the leak-out of the catalyst solution from the circumferential surface 11 of the honeycomb structure 10 further toward the outside is regulated. That is, it is possible to inhibit the catalyst solution from leaking out from a circumferential surface 34 of the circumferentially coated honeycomb structure 30 of the present embodiment, it is possible to prevent occurrence of stickiness or the like, and there does not occur the disadvantage that the catalyst solution adheres to a part of manufacturing facility in the subsequent manufacturing step, or the like.

In the circumferential coating material of the present embodiment, a composition contains two types of the color developing agents of silicon carbide and titanium oxide in laser printing. When the circumferential coating layer 20 made of the circumferential coating material receives irradiation with the laser of a predetermined wavelength (e.g., infrared laser), an irradiated region receiving the irradiation with the laser only develops its color into black and changes. Here, the circumferential coating layer 20 mainly possesses a light gray. Therefore, in a non-irradiated region of the light gray as a background, a character, a diagram, a symbol and the like of the irradiated region developed in black are displayed with a clear contrast. Here, in the present description, "black" does not only mean black of a completely achromatic color, but is also defined as, for example, the color having a brightness of 0 to about 60% and indicating a contrast between the irradiated region and the above non-irradiated region. According to the circumferential coating material of the present embodiment, it is possible to achieve excellent color development in the irradiated region by receiving the irradiation with the laser.

In particular, the circumferential coating material of the present embodiment includes titanium oxide as the color developing agent. The material includes titanium oxide, so that it is possible to bring, into a state closer to white, the color of the coating layer surface of the circumferential coating layer 20 formed on the circumferential surface 11 of the honeycomb structure 10. In a case where the circumferential coating material which does not include titanium oxide forms the circumferential coating layer, the color of the layer surface becomes close to a dark gray color or an ocher color. As a result, even when the circumferential coating layer is irradiated with the laser, the irradiated region develops its color into the black by silicon carbide, but the contrast between the irradiated region and the non-irradiated region decreases.

By adding titanium oxide to the circumferential coating material, it is possible to increase the contrast between the irradiated region developed in black and the white non-irradiated region. As a result, it is possible to decrease generation of reading errors when reading product control information CI (see FIG. 1) printed on the circumferential surface 34 by use of the scanner. As a result, product manufacturing and product control by use of the circumferentially coated honeycomb structure 30 are adjusted to be easy and efficient.

Furthermore, the circumferential coating material of the present embodiment forms the circumferential coating layer 20 on the circumferential surface 11 of the honeycomb structure 10, so that it is possible to improve print reading properties by ink jet printing while preventing the catalyst solution from leaking outside. In the circumferential surface 11 of the honeycomb structure 10 in which the circumferential coating layer 20 is not formed, contrast with a substrate decreases due to the leak-out of the catalyst solution, and hence a sufficient amount of ink to display the product control information CI cannot remain around the circumferential surface 11. Therefore, the printed surface of the product control information CI is displayed thinly, or oozing occurs in a boundary between the printed surface and a non-printed surface, and the display becomes obscure.

On the other hand, according to the circumferential coating material of the present embodiment, the layer surface (the circumferential surface 34) of the circumferential coating layer 20 possesses a membrane structure densified more than the circumferential surface 11 of the honeycomb structure 10, and hence the ink by the ink jet printing is not directed inwardly from the circumferential surface 34, but remains on the circumferential surface 34.

That is, the circumferential coating layer 20 has the already described function of preventing the catalyst solution from leaking out from the inner portions (the cells 32, the partition walls 33 or the like) of the circumferentially coated honeycomb structure 30 toward an outer portion (the circumferential surface 34), and furthermore, the circumferential coating layer can prevent the ink from permeating from the outer portion (the circumferential surface 34) of the circumferentially coated honeycomb structure 30 into the inner portions (the cells 32 or the partition walls 33).

Afterward, the ink remaining at an ink discharge position of the circumferential surface 34 dries, to clearly display the product control information CI. Consequently, similarly in the case of the above laser printing, it is possible to decrease the generation of the reading errors when reading the product control information CI (see FIG. 1) printed on the circumferential surface 34 by use of the scanner. As a result, the product manufacturing and product control by use of the circumferentially coated honeycomb structure 30 are adjusted to be easy and efficient. Furthermore, by a principle similar to the above principle, the circumferential coating material of the present embodiment can clarify the printing of the product control information CI by pad printing.

The circumferential coating material of the present embodiment is constituted in a slurry state in which silicon carbide and titanium oxide of the color developing agents including laser color developing properties and colloidal silica are uniformly dispersed. Here, a slurry specific weight of the circumferential coating material can be adjusted in a range of 1.8 to 2.0 $g/cm^3$. As described above, colloidal silica bonds silicon carbide and titanium oxide, and also functions as a bonding material (or an adhesive material) to bring the circumferential coating layer 20 into contact closely with the circumferential surface 11 of the honeycomb structure 10. For example, colloidal silica is usable in which an average diameter of dispersed silica particles is in a range of 13 to 17 nm.

A viscosity of the circumferential coating material can be adjusted in a range of 100 to 500 mPa·s. Thus, the viscosity is adjusted into such a range, thereby making it easy to coat the circumferential surface 11 of the honeycomb structure 10. Furthermore, it is possible to suitably change the range of the viscosity in accordance with a coating system of the circumferential coating material, but the above range of the viscosity is especially suitable in each of the coating systems of the spray coating and the roller coating.

In a case where the viscosity of the circumferential coating material is excessively low, the circumferential coating material to coat the circumferential surface 11 has a high fluidity, and therefore excessively enters into a circumference, so that the circumferential coating layer 20 having a sufficient membrane thickness cannot be formed, the above function of preventing the catalyst solution from leaking outside deteriorates, and the catalyst solution would leak outside. On the other hand, in a case where the viscosity is excessively high, coating properties by the spray coating or the roller coating deteriorate. Additionally, when the membrane thickness of the circumferential coating layer 20 is excessively large, there is the possibility that a part of the dried circumferential coating layer 20 generates cracks in the circumferential surface 11, or peels or falls off. Therefore, the viscosity of the circumferential coating material is suitably adjusted into the above range.

Furthermore, a coating weight density of the circumferential coating material can be adjusted in a range of 0.010 to 0.030 $g/cm^3$. Consequently, in the case of the honeycomb structure 10 of a standard size, the membrane thickness of the circumferential coating layer 20 can be 100 μm or less. There is not any special restriction on the membrane thickness of the circumferential coating layer 20 from the circumferential surface 11, as long as it is possible to sufficiently exert the function of preventing the catalyst solution from leaking outside, and it is possible to minimize increase of the whole weight of the circumferentially coated honeycomb structure 30 and increase of manufacturing cost due to the use of the circumferential coating material.

As described above, the circumferential coating material and the circumferentially coated honeycomb structure 30 of the present embodiment include the function of preventing the catalyst solution from leaking outside, and it is possible to achieve improvements of color developing and reading properties of the laser printing and the reading properties in the ink jet printing.

Hereinafter, examples of the circumferential coating material and circumferentially coated honeycomb structure of the present invention will be described, but the circumferential coating material and circumferentially coated honeycomb structure of the present invention are not limited to these examples.

EXAMPLES (1) Honeycomb Structure

A kneaded material obtained by preparing a forming material at a predetermined blend ratio and mixing and kneading the material was extruded by utilizing an extruder, and a honeycomb formed body was obtained. The obtained honeycomb formed body was dried and then fired at a predetermined temperature to prepare a honeycomb structure. In the present example, the honeycomb structure includes cordierite as a main component. The prepared honeycomb structure has porous partition walls, and the partition walls define and form a plurality of cells. Here, a porosity of the honeycomb structure is 63%.

(2) Circumferential Coating Material

Table 1 mentioned below shows respective blend ratios of colloidal silica, silicon carbide, titanium oxide, and water of each circumferential coating material (Examples 1 to 6 and Comparative Examples 1 to 3) to coat a circumferential surface of the honeycomb structure prepared by the above (1). Here, in Examples 1 to 6, each of the blend ratios of colloidal silica, silicon carbide, titanium oxide and water is in a range stipulated in the present invention, and each of Comparative Examples 1 to 3 deviates from the range of the blend ratio stipulated in the present invention. An average particle diameter of used colloidal silica is in a range of 13 to 17 nm, an average particle diameter of silicon carbide is in a range of 2 to 3 μm, and an average particle diameter of titanium oxide is in a range of 0.2 to 0.3 μm. That is, as compared with silicon carbide and titanium oxide functioning as color developing agents, an average particle diameter of colloidal silica functioning as a bonding material are remarkably small, and titanium oxide having an average particle diameter different from those of silicon carbide are used. In a slurried state in which each of these components is uniformly dispersed, the circumferential coating material is prepared so that a viscosity is in a range of 100 to 500 mPa·s.

(3) Formation of Circumferential Coating Layer

A circumferential surface of the honeycomb structure prepared by (1) was coated with each circumferential coating material prepared by the above (2), and forms a circumferential coating layer. In the present example, the circumferential surface of the honeycomb structure was coated with the circumferential coating material by a spray system, thereby obtaining the circumferential coating layer. At this time, an air pressure to spray the circumferential coating was set to 0.20 MPa. Furthermore, more specifically, the above honeycomb structure is mounted in a state of matching an axial direction with a vertical direction of a disc-like turntable. This turntable is turnable along the axial direction at a predetermined speed.

By turning the turntable, the honeycomb structure is rotated in the axial direction, and the circumferential coating material is sprayed from a spray nozzle fixed at a predetermined position at the above air pressure. In the present example, a rotational frequency of the turntable was set to 80 to 90 rpm, and a spraying time was set to enable spraying of the circumferential coating material as much as 1 to 2 g per second and to coat the circumferential surface of the honeycomb structure with about 4 to 6 g of circumferential coating material after completion of the spraying. Afterward, drying at room temperature was performed, whereby it was possible to obtain the circumferentially coated honeycomb structure in which the circumferential coating layer was formed on the circumferential surface of the honeycomb structure. Additionally, on layer surfaces of the formed circumferential coating layers, stipulated two-dimensional bar codes were printed, respectively, by use of usual laser marking device and ink jet printing device for evaluations of after-mentioned laser printing properties and ink jet printing properties, respectively.

Figure 2:
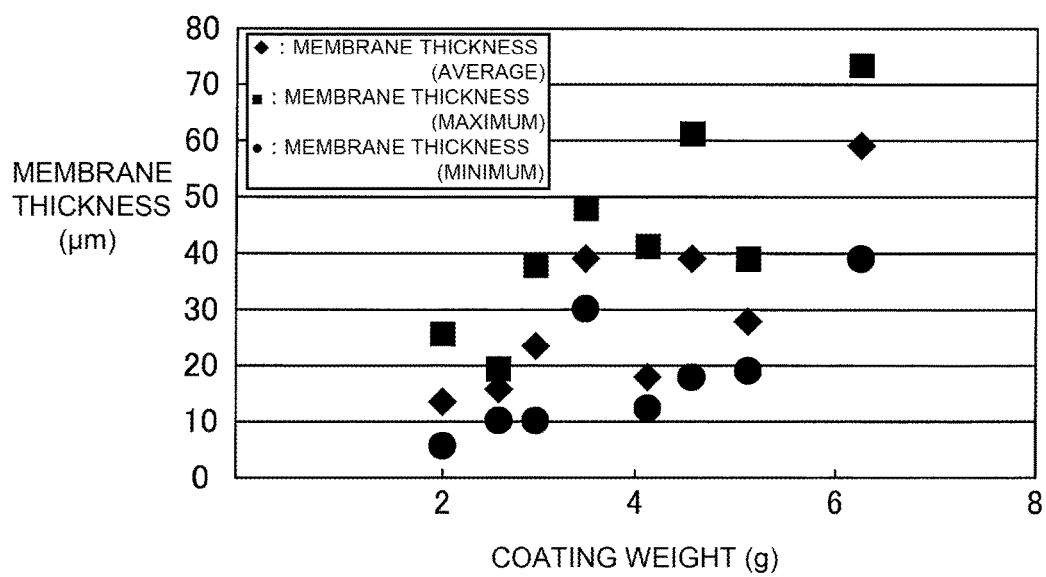
FIG. 2 is a graph showing a relation between a coating weight and a membrane thickness of the honeycomb structure.

FIG. 2 is a graph showing a relation between a coating weight and a membrane thickness of the circumferential coating layer to be formed in which the circumferential coating material of Example 2 was used. According to this graph, it was confirmed that the coating weight to the circumferential surface and the membrane thickness of the circumferential coating layer to be formed indicated a proportional relation. Furthermore, by coating the circumferential surface with the circumferential coating material having a coating weight of at least 4 g (0.014 g/cm$^2$), it is possible to securely prevent the catalyst solution from leaking outside.

(4) Evaluation of Circumferential Coating Layer

There were evaluated a coating unevenness to the formed circumferential coating layer, the leak-out of the catalyst solution, laser printing properties, membrane close contact properties (tape peeling), a membrane heat resistance (650° C./3 hr), and ink jet printing properties after the coating and after a heat treatment, respectively. Table 1 shows a summary of the results.

TABLE 1

| | Component | Ave. particle dia. | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Blend ratio | Colloidal silica/mass % | 13~17 nm | 50 | 40 | 37.7 | 27.8 | 22.3 | 17.2 | 12.5 | 8.1 | 3.9 |
| | Silicon carbide/mass % | 2~3 μm | 25 | 30 | 28.3 | 32.4 | 33.5 | 34.5 | 35.4 | 36.3 | 37.1 |
| | Titanium oxide/mass % | 0.2~0.3 μm | 25 | 30 | 28.3 | 32.4 | 33.5 | 34.5 | 35.4 | 36.3 | 37.1 |
| | Water/mass % | | 0 | 0 | 5.7 | 7.4 | 10.7 | 13.8 | 16.7 | 19.3 | 21.9 |
| | Solid content concentration | | 70 | 76 | 72 | 76 | 76 | 76 | 76 | 76 | 76 |
| Coating weight density/g/cm$^3$ | | | 0.010~0.030 | | | | | | | | |
| Drying | | | Room temp. drying | | | | | | | | |
| Coating system | | | Spray system | | | | | | | | |
| Coating unevenness | | | Excellent | Excellent | Excellent | Excellent | Excellent | Excellent | Excellent | Excellent | Failure |
| Leak-out of catalyst solution | | | Excellent | Excellent | Excellent | Excellent | Excellent | Excellent | Failure | Failure | Failure |

TABLE 1-continued

| | | | | | | | | | | |
|---|---|---|---|---|---|---|---|---|---|---|
| Laser printing properties | | Excellent | Excellent | Excellent | Excellent | Excellent | Excellent | Excellent | Excellent | Excellent |
| Membrane close contact properties (tape peeling) | | Excellent | Excellent | Excellent | Excellent | Excellent | Excellent | Excellent | Failure | Failure |
| Membrane heat resistance (650° C./3 hr) | | Excellent | Excellent | Excellent | Excellent | Excellent | Excellent | Failure | Failure | — |
| Ink jet printing properties | After coating | Excellent | Excellent | Excellent | Excellent | Excellent | Excellent | — | — | — |
| | After heat treatment | Excellent | Excellent | Excellent | Excellent | Excellent | Excellent | — | — | — |

(4-1) Evaluation of Coating Unevenness

The surface of the circumferential coating material was visually confirmed, the surface which did not have any coating unevenness was an evaluation of "excellent", and the surface in which the coating unevenness was confirmed was an evaluation of "failure".

(4-2) Evaluation of Leak-Out of Catalyst Solution

Indian ink diluted as much as 200 times was sucked up from an end face of the circumferentially coated honeycomb structure and dried, and then it was evaluated whether or not the leak-out of the Indian ink could visually be confirmed on the surface of the circumferential coating material. Here, a case where the leak-out of the Indian ink was not confirmed was an evaluation of "excellent", and a case where the leak-out could be confirmed was an evaluation of "failure".

(4-3) Evaluation of Laser Printing Properties

Laser printing printed on the layer surface of the circumferential coating layer was read by using Bar Code Reader (manufactured by Sick Corp.). A case where the reading by the bar code reader was possible was an evaluation of "excellent", and a case where the reading could not be done was an evaluation of "failure".

(4-4) Evaluation of Membrane Close Contact Properties

A tape was attached to the formed circumferential coating layer, the tape was peeled with predetermined force to confirm whether or not a membrane of the circumferential coating layer peeled from the circumferential surface, a case where the membrane did not peel was an evaluation of "excellent", and a case where the membrane peeled to expose a substrate was an evaluation of "failure".

(4-5) Evaluation of Heat Resistance

The circumferentially coated honeycomb structure was mounted in a high-temperature furnace in which an in-furnace temperature was maintained at 650° C. for 3 hr., a heat treatment was performed, the surface of the circumferential coating layer of the circumferentially coated honeycomb structure subjected to the heat treatment and taken out from the high-temperature furnace after elapse of 3 hr. was visually confirmed, a case where any cracks were not confirmed was an evaluation of "excellent", and a case where the cracks were confirmed was an evaluation of "failure".

(4-6) Ink Jet Printing Properties

A printed surface after the ink jet printing was rubbed with a finger, a case where any ink did not adhere to the finger was an evaluation of "excellent", and a case where the ink adhered to the finger was an evaluation of "failure".

According to this evaluation, it was confirmed that the circumferential coating materials of Examples 1 to 6 obtained suitable results, respectively. That is, it is possible to prevent the catalyst solution from leaking outside by the circumferential coating material prepared at the predetermined blend ratios by use of colloidal silica as a bonding material and two types of color developing agents of silicon carbide and titanium oxide, and it is possible to obtain the circumferential coating layer excellent in laser printing properties and ink jet printing properties. On the other hand, in the circumferential coating materials (Comparative Examples 1 to 3) deviating from the blend ratios stipulated in the present invention, in particular, it was indicated that the leak-out of the catalyst solution, the membrane close contact properties, the heat resistance or the like was evaluated as the failure. In particular, there was indicated the tendency that as the blend ratio of colloidal silica decreased, the generation of the coating unevenness and the membrane close contact properties deteriorated. Furthermore, Table 1 shows that "-" of each of Comparative Examples 1 to 3 indicates non-evaluation.

INDUSTRIAL APPLICABILITY

A circumferential coating material and a circumferentially coated honeycomb structure of the present invention can be utilized in the manufacturing of a honeycomb structure which can suitably be utilized as a carrier for a catalyst device or a filter in various fields of cars, chemistry, electric power, the iron and steel, and the like.

DESCRIPTION OF REFERENCE NUMERALS

10: honeycomb structure, 11 and 34: circumferential surface, 20: circumferential coating layer, 30: circumferentially coated honeycomb structure, 31a: one end face, 31b: other end face, 32: cell, 33: partition wall, and CI: product control information.

The invention claimed is:

1. A circumferential coating material which contains colloidal silica, silicon carbide, and titanium oxide different in average particle diameter from the silicon carbide, coats a circumferential surface of a honeycomb structure monolithically formed by extrusion, including as a main component, cordierite having a porosity of 50 to 75%, and forms a circumferential coating layer wherein an average particle diameter of the silicon carbide is from 1.0 to 10 µm, and the average particle diameter of the titanium oxide different in average particle diameter from the silicon carbide is from 0.1 to 1.0 µm.

2. The circumferential coating material according to claim 1, which contains 15 to 50 mass % of the colloidal silica, contains 25 to 35 mass % of the silicon carbide, and contains 25 to 35 mass % of the titanium oxide.

3. The circumferential coating material according to claim 2, which contains 15 to 30 mass % of the colloidal silica, contains 30 to 35 mass % of the silicon carbide, contains 30 to 35 mass % of the titanium oxide, and contains 0 to 15 mass % of water.

4. The circumferential coating material according to claim 1, wherein the circumferential coating layer formed on the circumferential surface of the honeycomb structure exhibits laser color developing properties by laser printing and/or printing properties of ink jet printing.

5. A circumferentially coated honeycomb structure using the circumferential coating material according to claim 1,
which has a honeycomb structure comprising latticed porous partition walls defining and forming a plurality of polygonal cells forming through channels and extending from one end face to the other end face, and
a circumferential coating layer formed by coating at least a part of a circumferential surface of the honeycomb structure with the circumferential coating material.

* * * * *